US012413862B2

(12) United States Patent
Jeon et al.

(10) Patent No.: US 12,413,862 B2
(45) Date of Patent: Sep. 9, 2025

(54) ACTUATOR FOR CAMERA

(71) Applicant: JAHWA ELECTRONICS CO., LTD., Cheongju-si (KR)

(72) Inventors: Ki Hoon Jeon, Incheon (KR); Hee Seung Kim, Seoul (KR); Myung Hoon Jang, Incheon (KR); Min Seok Han, Siheung-si (KR)

(73) Assignee: JAHWA ELECTRONICS CO., LTD., Cheongju-si (KR)

( * ) Notice: Subject to any disclaimer, the term of this patent is extended or adjusted under 35 U.S.C. 154(b) by 516 days.

(21) Appl. No.: 17/816,309

(22) Filed: Jul. 29, 2022

(65) Prior Publication Data
US 2023/0033037 A1 Feb. 2, 2023

(30) Foreign Application Priority Data
Jul. 30, 2021 (KR) ........................ 10-2021-0100589

(51) Int. Cl.
*H04N 23/68* (2023.01)
*G02B 7/08* (2021.01)
*G02B 27/64* (2006.01)
*H04N 23/54* (2023.01)
*H04N 23/55* (2023.01)

(52) U.S. Cl.
CPC ............. *H04N 23/687* (2023.01); *G02B 7/08* (2013.01); *G02B 27/646* (2013.01); *H04N 23/54* (2023.01); *H04N 23/55* (2023.01)

(58) Field of Classification Search
CPC ...... H04N 23/687; H04N 23/54; H04N 23/55; H04N 23/57; G02B 7/08; G02B 27/646
See application file for complete search history.

(56) References Cited

U.S. PATENT DOCUMENTS

2015/0346587 A1* 12/2015 Lim ........................ G03B 17/02
348/373
2021/0247663 A1* 8/2021 Lee ........................ G03B 5/02
(Continued)

FOREIGN PATENT DOCUMENTS

KR  10-2010-0121146 A  11/2010
KR  10-2017-0007263 A  1/2017
(Continued)

OTHER PUBLICATIONS

International Search Report for PCT/KR2022/010647 by Korean Intellectual Property Office dated Oct. 19, 2022.

*Primary Examiner* — George G. King
*Assistant Examiner* — Natasha Nigam
(74) *Attorney, Agent, or Firm* — BROADVIEW IP LAW, PC (57) ABSTRACT

The present invention provides an actuator for a camera, including an OIS carrier, in which a lens module or an image sensor is mounted, and moving the lens module or image sensor in at least one of a first direction perpendicular to an optical axis direction and a second direction perpendicular to the first direction; an AF carrier for accommodating the OIS carrier and moving the OIS carrier in the optical axis direction; and a housing in which the AF carrier is accommodated, wherein the AF carrier has an opening such that the OIS carrier faces the housing, and wherein the OIS carrier has an auxiliary stopper protruding so as to be able to contact the housing through the opening.

11 Claims, 9 Drawing Sheets

(56) References Cited

U.S. PATENT DOCUMENTS

2022/0099992 A1* 3/2022 Park .................... G03B 5/02
2022/0385136 A1* 12/2022 Wu .................... G03B 13/34

FOREIGN PATENT DOCUMENTS

| KR | 10-1792431 | B1 | | 10/2017 | | |
|---|---|---|---|---|---|---|
| KR | 10-2019-0089879 | A | | 7/2019 | | |
| KR | 10-2021-0009495 | A | | 1/2021 | | |
| KR | 20210009495 | A | * | 1/2021 | ........... | H04N 23/685 |
| KR | 20210014301 | A | * | 2/2021 | ............ | H04N 23/60 |
| TW | 201535036 | A | * | 9/2015 | ........... | G02B 27/646 |

* cited by examiner

ACTUATOR FOR CAMERA

CROSS-REFERENCE TO RELATED APPLICATION

This application claims priority to and the benefit of Korean Patent Application No. 10-2021-0100589, filed on Jul. 30, 2021, in the Korean Intellectual Property Office, the disclosure of which is incorporated herein by reference in its entirety.

FIELD OF THE INVENTION

The present invention relates to an actuator for a camera, and more specifically to an actuator which is capable of implementing autofocus and optical image stabilization functions.

DISCUSSION OF RELATED ART

As the hardware technology for image processing has been developed and the user needs for image shooting have increased, functions such as autofocus (AF) and optical image stabilization (OIS) have been applied to a camera module or the like, which is mounted to a portable terminal such as a cellular phone and a smart phone as well as an independent camera device.

An autofocus (AF) function (or an automatically focusing function) means a function of adjusting a focal length to a subject by linearly moving a carrier having a lens in an optical axis direction to generate a clear image at an image sensor (CMOS, CCD, etc.) located at the rear of the lens.

In addition, an optical image stabilization function means a function of improving image sharpness by adaptively moving a carrier on which the lens is mounted in a direction to compensate for the shaking when the lens shakes due to hand shaking.

One of the representative methods for implementing the AF or OIS function is to install a magnet (a coil) on a mover (a carrier) and install a coil (a magnet) on a stator (a housing, another type of carrier, etc.), and then generate an electromagnetic force between the coil and the magnet such that the mover moves in the optical axis direction or in a direction perpendicular to the optical axis.

Meanwhile, there is a device that connects the carrier to a wire in order to physically support the carrier and restore the position of the carrier. However, if the device is used, the physical properties of the wire may be easily deformed due to the internal and external environment, thereby easily deteriorating the driving precision. In particular, as the weight and size of the lens increase due to high specification of the lens, driving performance may be further deteriorated.

In order to solve the problem of the wire type, recently, a ball is interposed between the mover and the stator to maintain a proper separation distance between the mover and the stator, and the carrier moves more flexibly and accurately by means of a minimized frictional force through the rotational motion of the ball and the point contact with the ball.

In the case of a device or actuator in which the AF and OIS functions are integrated, an AF carrier must move in the optical axis direction and an OIS carrier must move in a direction perpendicular to the optical axis, resulting in a complex physical structure in which the AF and OIS carriers are stacked on each other.

Since the AF carrier moves in the optical axis direction, a certain gap is maintained between the AF carrier and the housing. However, since the OIS carrier moves in a direction perpendicular to the optical axis, the gap between the OIS carrier and the AF carrier is changed according to the movement of the OIS carrier, and accordingly, the electromagnetic force applied to the magnet also changes.

In this case, there are limitations for the magnet to provide a driving force to the OIS carrier in a section where the OIS carrier and the AF carrier are farthest apart from each other according to the movement of the OIS carrier.

Further, in an actuator in which the OIS carrier and the AF carrier are combined and a camera module including the same, the trend is that the weight of the moving object is increasing due to the high weight of the lens module or the high pixel of the image sensor. However, since the space of a mobile camera module is limited, it is necessary to develop a technique which is capable of preventing collisions between components within a limited space and increasing driving force in order to respond to this trend.

SUMMARY OF THE INVENTION

In order to solve the aforementioned problems, an object of the present invention is to provide an actuator for a camera, which is capable of preventing collision between components within a limited space and increasing driving force.

In addition, another object of the present invention is to provide an actuator for a camera, which is capable of providing sufficient driving force to an OIS carrier even in a section in which the OIS carrier and the AF carrier are farthest apart from each other according to the movement of the OIS carrier.

In addition, still another object of the present invention is to provide an actuator for a camera, which is capable of driving a lens module or an image sensor with a relatively long stroke by increasing a driving force.

Other objects and advantages of the present invention can be understood from the following description, and these will be more clearly understood by the exemplary embodiments of the present invention. In addition, the objects and advantages of the present invention can be realized by the configurations shown in the claims and the combination of the configurations.

In order to achieve the above objects, the present invention provides an actuator for a camera, including an OIS carrier, in which a lens module or an image sensor is mounted, and moving the lens module or image sensor in at least one of a first direction perpendicular to an optical axis direction and a second direction perpendicular to the first direction; an AF carrier for accommodating the OIS carrier and moving the OIS carrier in the optical axis direction; and a housing in which the AF carrier is accommodated, wherein the AF carrier has an opening such that the OIS carrier faces the housing, and wherein the OIS carrier has an auxiliary stopper protruding so as to be able to contact the housing through the opening.

Herein, the auxiliary stopper is in contact with the housing when the OIS carrier is moved in at least one of the first direction and the second direction by an external impact to limit the movement of the OIS carrier.

Herein, a first gap for moving the AF carrier is formed between the AF carrier and the housing, and a second gap for providing a movement space of the OIS carrier is formed between the OIS carrier and the AF carrier.

In addition, a third gap which is larger than the second gap and smaller than the sum of the first gap and the second gap is formed between the auxiliary stopper and the housing.

In addition, when the auxiliary stopper contacts the housing, the sum of the first gap and the second gap is maintained as a fourth gap.

In addition, the OIS carrier is provided with a first magnet and a second magnet, and the housing is provided with a first driving coil that generates an electromagnetic force in the first magnet to move the OIS carrier in the first direction, and a second driving coil that generates an electromagnetic force in the second magnet to move the OIS carrier in the second direction.

In addition, the auxiliary stopper is respectively provided on both sides of the first magnet and the second magnet.

In addition, the thicknesses of the first magnet and the second magnet are formed to correspond to the length of the auxiliary stopper.

In addition, when the auxiliary stopper contacts the housing, a fifth gap which is smaller than the fourth gap is formed in at least one of between the first magnet and the first driving coil and between the second magnet and the second driving coil.

In addition, a sixth gap in which the third gap and the fifth gap are added is formed between the first magnet and the second magnet and between the first driving coil and the second driving coil.

In addition, the actuator for a camera according to the present invention further includes a middle guide for guiding the movement of the OIS carrier in the first direction or the second direction.

According to the present invention, by providing an auxiliary stopper on one side of the carrier to prevent collisions between components, it is possible to provide the same or higher function as before by reducing the volume of the existing damper, and as a result, it is possible to increase the driving force within a limited space without increasing the space of an actuator by securing more space for the actuator (magnet and coil).

In addition, according to the present invention, since it is possible to increase the thickness of the magnet while minimizing the gap between the magnet and the driving coil, it is possible to provide sufficient driving force to the OIS carrier even in a section where the OIS carrier and the AF carrier are farthest apart from each other according to the movement of the OIS carrier.

In addition, according to the present invention, by increasing the driving force, it is possible to drive the lens module or image sensor with a relatively long stroke, and it is possible to effectively apply to image sensors and lens modules with a large size and weight, as well as securing product reliability.

The effects that can be obtained in the present invention are not limited to the aforementioned effects, and other effects that are not mentioned may be clearly understood by those of ordinary skill in the art to which the present invention pertains from the following description.

DETAILED DESCRIPTION OF EXEMPLARY EMBODIMENTS

Hereinafter, preferred exemplary embodiments of the present invention will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present invention on the basis of the principle that the inventor is allowed to define terms appropriately for the best explanation.

Therefore, the exemplary embodiments described in this specification and the configurations illustrated in the drawings are merely the most preferred exemplary embodiment of the present invention and do not represent all the technical spirit of the present invention, and thus, it should be understood that there may be various equivalents and modifications that may substitute the same at the time of filing the present application.

Figure 1:
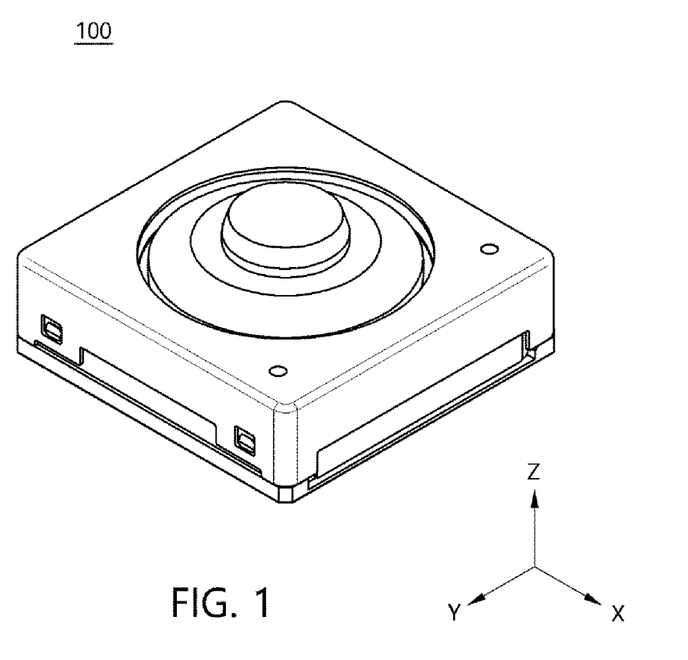
FIG. 1 is a perspective view of the actuator for a camera (hereinafter, referred to as an 'actuator') according to an exemplary embodiment of the present invention.
Figure 2:
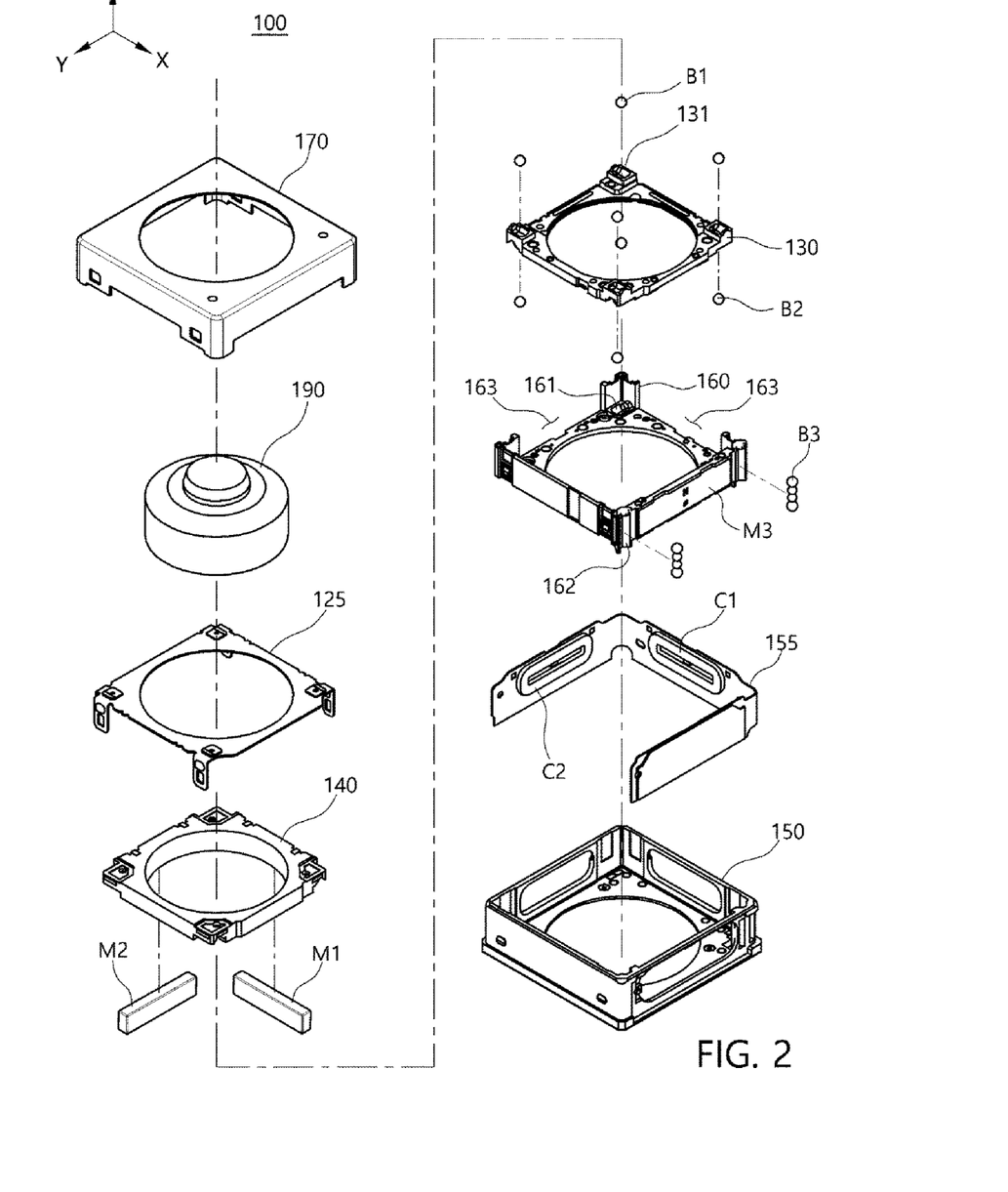
FIGS. 2 and 3 are exploded views illustrating the configuration of the actuator according to an exemplary embodiment of the present invention.
Figure 3:
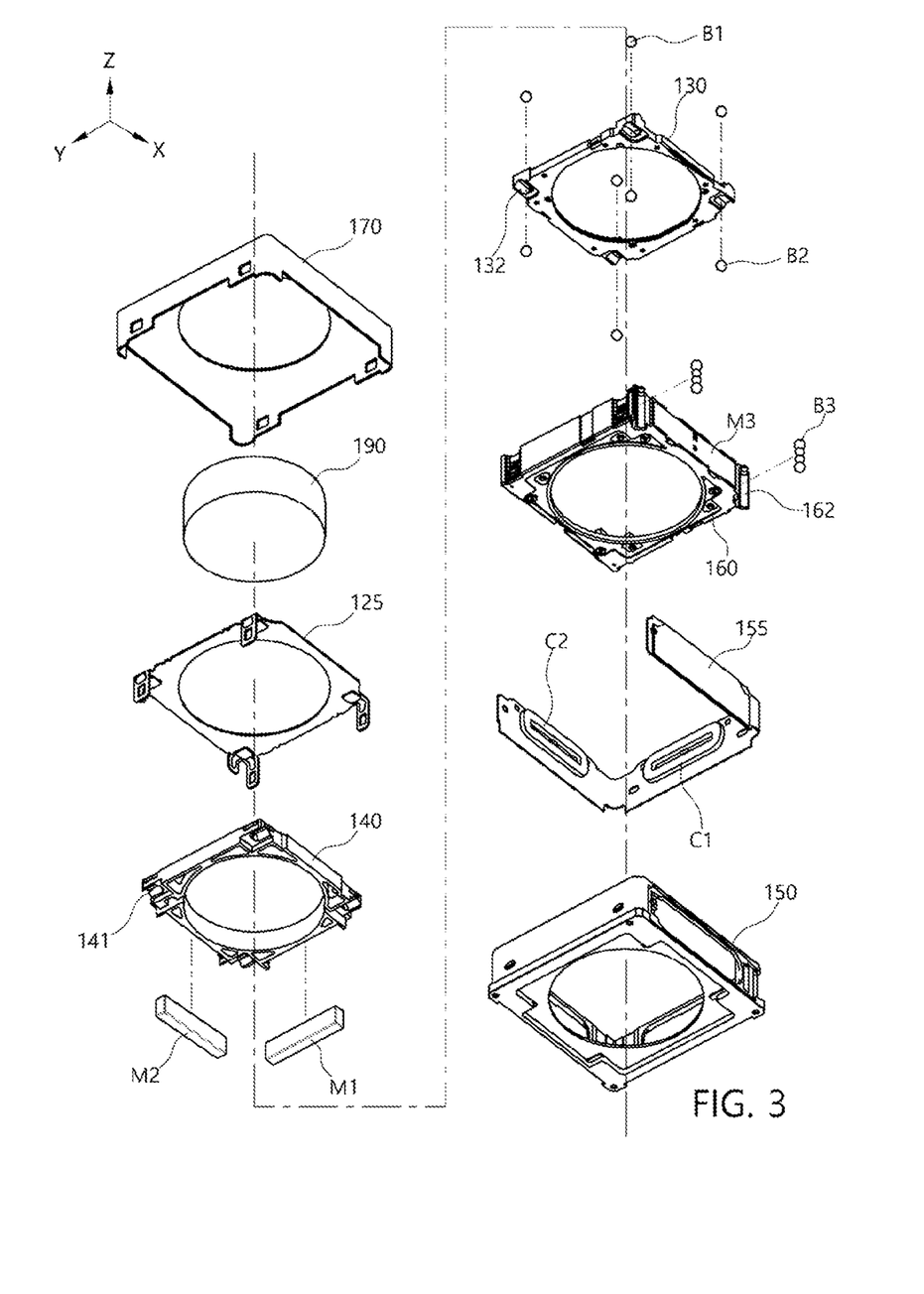

FIG. 1 is a perspective view of the actuator for a camera (hereinafter, referred to as an 'actuator') according to an exemplary embodiment of the present invention, and FIGS. 2 and 3 are exploded views illustrating the configuration of the actuator according to an exemplary embodiment of the present invention.

Hereinafter, the overall configuration of an actuator according to an exemplary embodiment of the present invention will be first described with reference to FIGS. 1 to 3, and the detailed description of the exemplary embodiments of the present invention for implementing the respective functions of AF and OIS will be described below.

The actuator 100 according to an exemplary embodiment of the present invention is an exemplary embodiment in which auto focus (AF) and optical image stabilization (OIS) are implemented together by driving a lens module 190 or an image sensor (not illustrated). However, it is certain that the actuator 100 of the present invention may be implemented as an actuator only for OIS according to an exemplary embodiment.

The Z-axis direction illustrated in FIGS. 1 to 3 is an optical axis direction, which is a direction in which light is introduced into the lens module 190 and corresponds to a direction in which the AF carrier 160 moves forward and backward. In addition, the optical axis means a central axis of the lens module 190 when the lens module 190 is driven, and means a central axis of the image sensor when an image sensor (not illustrated) is driven.

In addition, the X-axis direction and the Y-axis direction, which are two directions perpendicular to the optical axis direction (Z-axis direction), refer to the directions in which the lens module 190 or the image sensor moves by OIS driving so as to compensate for shaking caused by hand shaking. In the following description, the X-axis direction is referred to as a first direction and the Y-axis direction is referred to as a second direction, but this is only an example according to the relative point of view, and it is certain that any one of the X-axis direction and the Y-axis direction may be the first direction, and the other direction may be the second direction.

The actuator 100 according to an exemplary embodiment of the present invention may implement OIS and AF by driving the lens module 190 or the image sensor, but hereinafter, the method of implementing OIS and AF through driving the lens module 190 will be described as an exemplary embodiment.

The actuator 100 according to an exemplary embodiment of the present invention may be configured to include an OIS carrier 140, a middle guide 130, a housing 150, an AF carrier 160, a case 170 and a lens module 190.

The actuator 100 according to an exemplary embodiment of the present invention may have a structure in which the housing 150, AF carrier 160, middle guide 130, OIS carrier 140, lens module 190 and case 170 are sequentially coupled. In addition, an opening for mounting the lens module 190 may be formed in the center of these components. Although not illustrated in the drawings, an image sensor may be provided under the housing 150.

The lens module 190 is mounted on the OIS carrier 140, and the middle guide 130 is disposed under the OIS carrier 140. In addition, the OIS carrier 140 and the middle guide 130 are accommodated in the AF carrier 160. In addition, the AF carrier 160 is accommodated in the housing 150 while the OIS carrier 140 and the middle guide 130 are accommodated therein.

The OIS carrier 140 may move in at least one of the first direction and the second direction within the AF carrier 160.

The OIS carrier 140 includes first and second magnets (M1, M2), and the AF carrier 160 includes a third magnet (M3). In addition, the housing 150 is provided with first to third driving coils (C1, C2, C3) to face the first to third magnets (M1, M2, M3), respectively.

Herein, the first to third driving coils (C1, C2, C3) may be provided on the inner surface of the housing 150 while being mounted on a substrate 155.

The AF carrier 160 has an opening 163 such that the OIS carrier 140 faces the housing 150. That is, the AF carrier 160 has an opening 163 such that the first magnet (M1) provided in the OIS carrier 140 faces the first driving coil (C1) provided in the housing, and has an opening 163 such that the second magnet (M2) provided in the OIS carrier 140 faces the second driving coil (C2) provided in the housing. In the OIS carrier 140, an opening for exposing the image sensor (not illustrated) in the optical axis direction while mounting the lens module 190 is formed in the center. Accordingly, the image sensor may detect the light coming from the lens module 190.

Herein, the image sensor may be formed of an imaging device such as a charge-coupled device (CCD) or a complementary metal-oxide semiconductor (CMOS).

When the AF carrier 160 moves forward and backward in the optical axis direction, the lens module 190 also moves forward and backward in the optical axis direction so as to adjust the focal length between the lens module 190 and the image sensor, thereby implementing the AF function. The detailed description thereof will be provided below.

A first guide rail 131 is formed on an upper portion of the middle guide 130 in the first direction, and a second guide rail 141 is formed on a lower portion of the OIS carrier 140 to face the first guide rail 131. In addition, a first OIS ball (B1) is provided between the first and second guide rails 131, 141.

A third guide rail 132 is formed on a lower portion of the middle guide 130 in the second direction, and a fourth guide rail 161 is formed on an upper portion of the AF carrier 160 to face the third guide rail 132. In addition, a second OIS ball (B2) is provided between the third and fourth guide rails 132, 161.

A fifth guide rail 162 is formed outside the AF carrier 160 in the optical axis direction, and a sixth guide rail (not illustrated) is formed inside the housing 150 to face the fifth guide rail 162. In addition, the AF ball (B3) is provided between the fifth and sixth guide rails 162 (not illustrated).

The stopper 125 serves to limit the upper movement of the AF carrier 160 in the optical axis direction.

The case 170 may be configured to cover the housing 150. Herein, the image sensor may be fixed to the lower portion of the housing 150. As described above, the actuator 100 according to an exemplary embodiment of the present invention may implement both OIS and AF by moving the lens module 190 in three axes while the image sensor is fixed.

Certainly, by mounting the image sensor instead of the lens module 190 on the OIS carrier 140 and the AF carrier 160 and moving the image sensor in three axes while the lens module 190 is fixed, both OIS and AF may be implemented.

Figure 4:
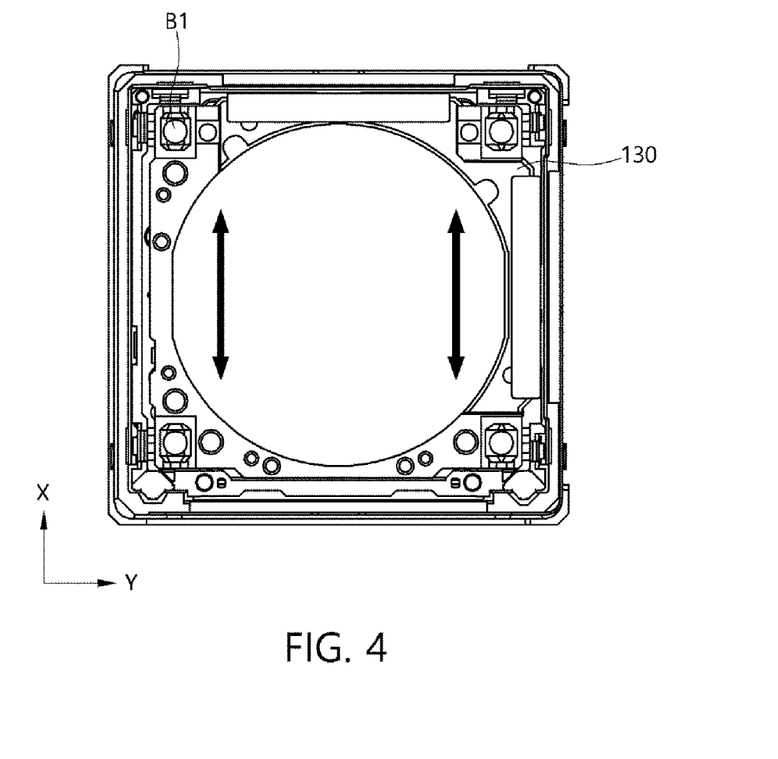
FIG. 4 is a view for explaining the function of OIS in the X-axis direction of the actuator according to an exemplary embodiment of the present invention.
Figure 5:
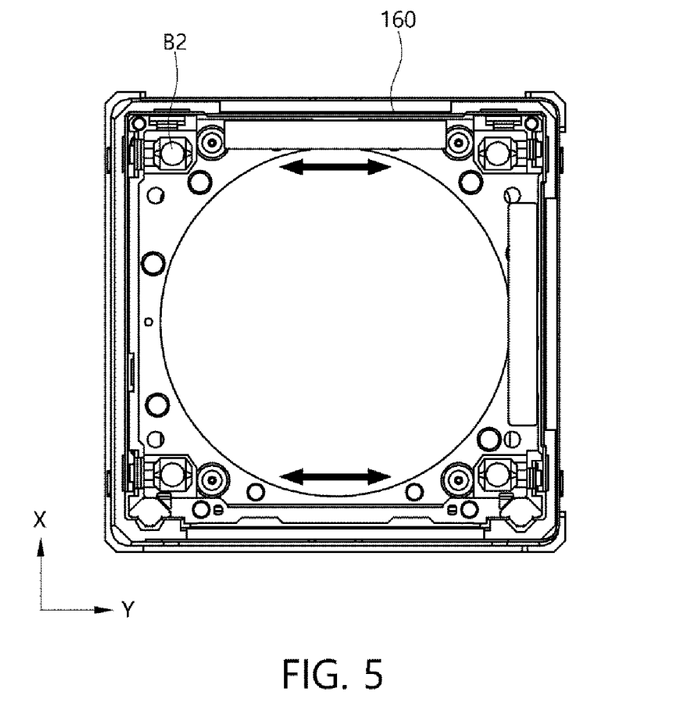
FIG. 5 is a view for explaining the function of OIS in the Y-axis direction of the actuator according to an exemplary embodiment of the present invention.

FIG. 4 is a view for explaining the function of OIS in the X-axis direction of the actuator according to an exemplary embodiment of the present invention, and FIG. 5 is a view for explaining the function of OIS in the Y-axis direction of the actuator according to an exemplary embodiment of the present invention.

Referring to FIG. 4, the actuator 100 according to an exemplary embodiment of the present invention includes a first guide rail 131 formed on an upper portion of the middle guide 130 in a first direction (X-axis direction), a second guide rail 141 formed on a lower portion of the OIS carrier 140 to face the first guide rail 131, and a first OIS ball (B1) provided between the first and second guide rails 131, 141.

The first OIS ball (B1) may move the OIS carrier 140 in the first direction by rolling between the first and second guide rails 131, 141.

The first guide rail 131 may be formed at each corner of the first middle guide 130, and the second guide rail 141 may also be formed at each corner of the OIS carrier 140, but the present invention is not limited thereto.

The first magnet (M1) is provided on one side of the OIS carrier 140 and is disposed between the two first OIS balls (B1) in the first direction.

The first driving coil (C1) is disposed on the inner surface of the housing 150 to face the first magnet (M1). Herein, a Hall sensor may be provided inside the first driving coil (C1).

When the OIS function of the first direction (X-axis direction) is implemented, the OIS carrier 140 moves in the first direction with respect to the housing 150 in the inner space of the AF carrier 160.

The Hall sensor transmits an electrical signal corresponding to the motion direction and magnitude of hand shaking to a driving driver (not illustrated), and the driving driver controls such that the power of the corresponding magnitude and direction is applied to the first driving coil (C1). That is, the OIS carrier 140 may be moved through feedback control between the Hall sensor and the driving driver.

When power is applied to the first driving coil (C1), the first driving coil (C1) generates an electromagnetic force in the first magnet (M1) provided in the OIS carrier 140, and by this electromagnetic force, the first OIS ball (B1) rolls between the first and second guide rails 131, 141, and accordingly the OIS carrier 140 moves in the first direction.

Herein, since the lens module 190 is coupled to the OIS carrier 140, when the OIS carrier 140 moves in the first direction, the lens module 190 also moves in the first direction. Accordingly, the hand shaking caused by the first direction component is corrected.

Referring to FIG. 5, the actuator 100 according to an exemplary embodiment of the present invention includes a third guide rail 132 formed on a lower portion of the middle guide 130 in a second direction (Y-axis direction), a fourth guide rail 161 formed on an upper portion of the AF carrier 160 to face the third guide rail 132, and a second OIS ball (B2) provided between the third and fourth guide rails 132, 161.

The second OIS ball (B2) may move the OIS carrier 140 in the second direction by rolling between the third and fourth guide rails 132, 161.

The third guide rail 132 may be formed at each corner of the middle guide 130, and the fourth guide rail 161 may also be formed at each corner of the AF carrier 160, but the present invention is not limited thereto.

The second magnet (M2) is provided on one side of the OIS carrier 140 adjacent to the first magnet (M2), and is disposed between the two second OIS balls (B2) in the second direction.

The second driving coil (C2) may be disposed on the inner surface of the housing 150 to face the second magnet (M2), and a Hall sensor may be provided inside the second driving coil (C2).

When the OIS function in the second direction (Y-axis direction) is implemented, the OIS carrier 140 moves in the second direction with respect to the housing 150 in the inner space of the AF carrier 160.

The Hall sensor transmits an electric signal corresponding to the motion direction and magnitude of hand shaking to a driving driver (not illustrated), and the driving driver controls such that the power of the corresponding magnitude and direction is applied to the second driving coil (C2). That is, the OIS carrier 140 may be moved through feedback control between the Hall sensor and the driving driver.

When power is applied to the second driving coil (C2), the second driving coil (C2) generates an electromagnetic force in the second magnet (M2) installed in the OIS carrier 140, and by this electromagnetic force, the second OIS ball (B2) rolls between the third and fourth guide rails 132, 161, and accordingly, the OIS carrier 140 moves in the second direction.

Herein, since the lens module 190 is coupled to the OIS carrier 140, when the OIS carrier 140 moves in the second direction, the lens module 190 also moves in the second direction. Accordingly, the hand shaking caused by the second direction component is corrected.

Figure 6:
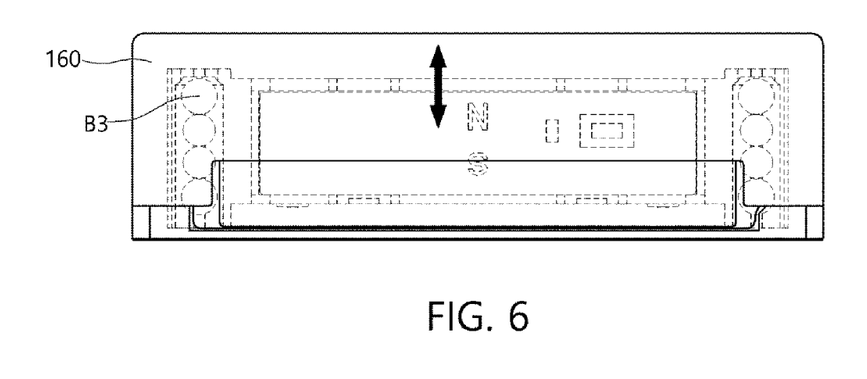
FIG. 6 is a view for explaining the function of AF in the optical axis direction of the actuator according to an exemplary embodiment of the present invention.

FIG. 6 is a view for explaining the function of AF in the optical axis direction of the actuator according to an exemplary embodiment of the present invention.

Referring to FIG. 6, the actuator 100 according to an exemplary embodiment of the present invention includes a fifth guide rail 162 formed on the outside of the AF carrier 160 in the optical axis direction (Z axis direction), a sixth guide rail (not illustrated) formed on the inside of the housing to face the fifth guide rail 162, and an AF ball (B3) provided between the fifth and sixth guide rails 162 (not illustrated).

The AF ball (B3) may move the AF carrier 160 in the optical axis direction by rolling between the fifth and sixth guide rails 162 (not illustrated).

The fifth guide rail 162 may be respectively formed on both sides of the outer surface of the AF carrier 160 provided with the third magnet (M3).

The third magnet (M3) is provided between the fifth guide rails 162, and the third driving coil (C3) is disposed on the inner surface of the housing 150 to face the third magnet (M3), and a Hall sensor may be provided inside the third driving coil (C3).

The AF carrier 160 may be moved through feedback control between the Hall sensor and the driving driver.

The housing 150 provides a moving space of the AF carrier 160. In addition, the AF carrier 160 is provided inside the housing 150 and moves in the optical axis direction (Z-axis direction) with respect to the housing 150.

When power having an appropriate size and direction is applied to the third driving coil (C3), the third driving coil (C3) generates an electromagnetic force in the third magnet (M3) installed in the AF carrier 160, and by this electromagnetic force, the AF ball (B3) rolls between the fifth and sixth guide rails 162 (not illustrated), and accordingly, the AF carrier 160 moves in the optical axis direction.

The OIS carrier 140 is accommodated in the AF carrier 160, and the OIS carrier 140 is coupled to the lens module 190 such that when the AF carrier 160 moves in the optical axis direction, the OIS carrier 140 and the lens module 190 also move in the optical axis direction so as to adjust the focal length between the lens module 190 and the image sensor.

Since the above-described first and second direction movement of the OIS carrier 140 and the optical axis direction movement of the AF carrier 160 are independently driven by separate processing and separate physical structure, the movement in each direction may be made individually, and certainly, the movement in a plurality of mutually combined directions (XY, XZ, YZ, XYZ, etc.) may be made simultaneously.

Figure 7:
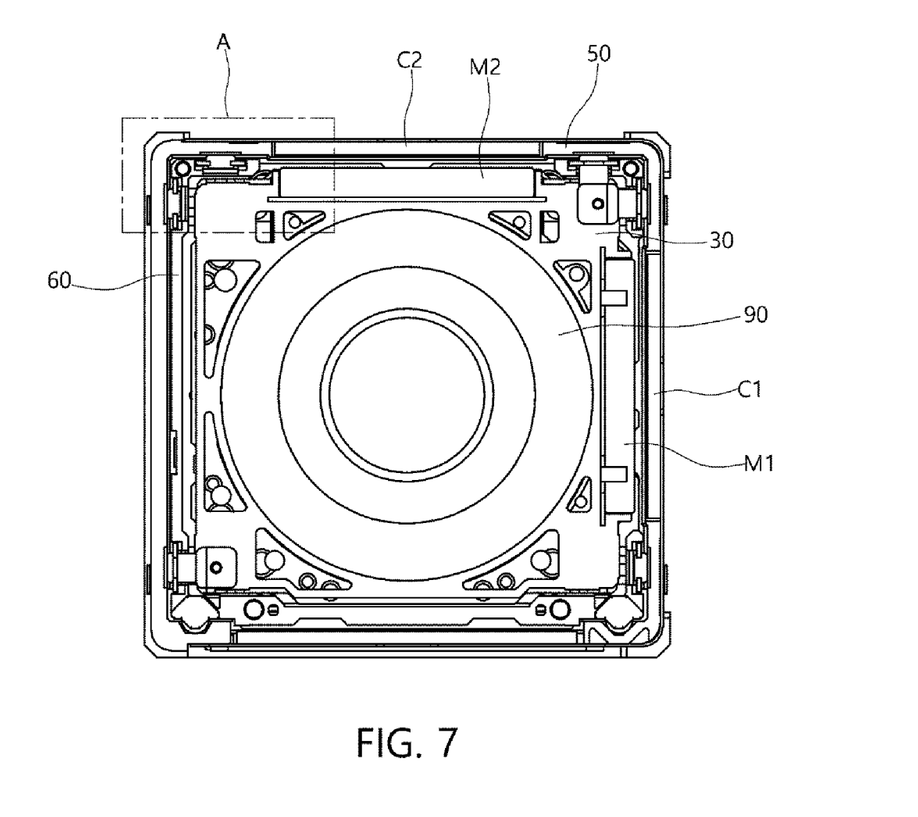
FIG. 7 is an internal plan view of the conventional actuator for a camera.
Figure 8:
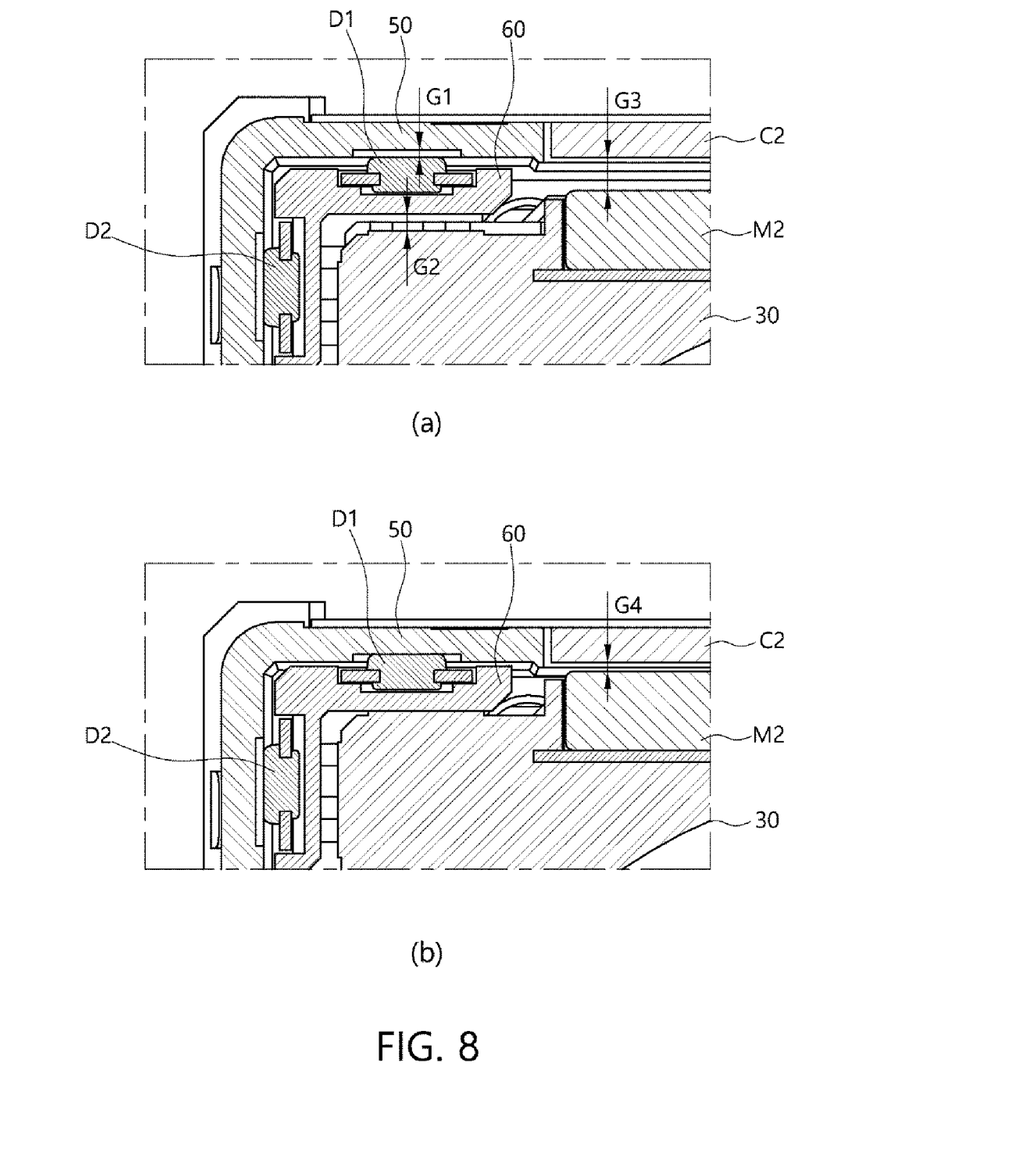
FIG. 8 is a partially enlarged view of part A of FIG. 7.

FIG. 7 is an internal plan view of the conventional actuator for a camera, and FIG. 8 is a partially enlarged view of part A of FIG. 7.

Herein, FIG. 8(a) is a view of a state in which there is no external impact due to the fall of a product equipped with an actuator, and FIG. 8(b) is a view of a state in which an external impact occurs.

Referring to FIGS. 7 and 8, the conventional actuator for a camera is configured to include an OIS carrier 30 on which a lens module 90 is mounted, an AF carrier 60 in which the OSI carrier 30 is accommodated, and a housing 50 in which the AF carrier 60 is accommodated.

Herein, the OIS carrier 30 moves the lens module 90 in the first direction and the second direction, and the AF carrier 60 moves the OIS carrier 30 in the optical axis direction.

The OIS carrier 30 includes first and second magnets (M1, M2), and the housing 50 faces the first and second magnets (M1, M2) and includes first and second driving coils (C1, C2).

Herein, the AF carrier 60 may include a first damper (D1) and a second damper (D2) in order to mitigate the impact during contact between the AF carrier 60 and the housing 50.

Referring to FIG. 8(a), a first gap (G1) for moving the AF carrier 60 is formed between the AF carrier 60 and the housing 50, and a second gap (G2) for providing a movement space of the OIS carrier 30 between the OIS carrier 30 and the AF carrier 60 is formed. For example, the first gap (G1) may be 0.1 mm, and the second gap (G2) may be 0.22 mm.

Herein, referring to FIG. 8(b), even if both the first gap (G1) and the second gap (G2) disappear due to an external impact, in order to prevent damage to the first and second drive coils (C1, C2) due to the contact between the first and second magnets (M1, M2) and the first and second driving coils (C1, C2) and to maintain reliability, a safe distance of a fourth gap (G4) or more must be maintained between the first and second magnets (M1, M2) and the first and second driving coils (C1, C2). For example, the fourth gap (G4) may be 0.09 mm.

In summary, as shown in FIG. 8(a), in the absence of an external impact, a third gap (G3), which is the sum of the first gap (G1), the second gap (G2) and the fourth gap (G4), must be formed between the first and second magnets (M1, M2) and the first and second driving coils (C1, C2). For example, the third gap (G3) may be 0.41 mm.

Meanwhile, in the absence of an external impact, since the AF carrier 60 moves in the optical axis direction, the first gap (G1) between the AF carrier 60 and the housing 50 is constantly maintained. However, since the OIS carrier 30 moves in the first and second directions perpendicular to the optical axis, the second gap (G2) between the OIS carrier 30 and the AF carrier 60 is changed according to the movement of the OIS carrier 30, and accordingly, the electromagnetic force applied to the first and second magnets (M1, M2) is also changed.

In this way, since a relatively large third gap (G3) (e.g., 0.41 mm) is formed between the first and second magnets (M1, M2) and the first and second driving coils (C1, C2), there is a limitation in providing a driving force to the OIS carrier 30 according to the movement of the OIS carrier 30 in a section where the OIS carrier 30 and the AF carrier 60 are farthest apart from each other.

In particular, the above problem makes it difficult to implement products and impairs product reliability in a situation where the size of the image sensor and the lens module is increased, the weight is increased, and long stroke driving of the image sensor and the lens module is required.

Figure 9:
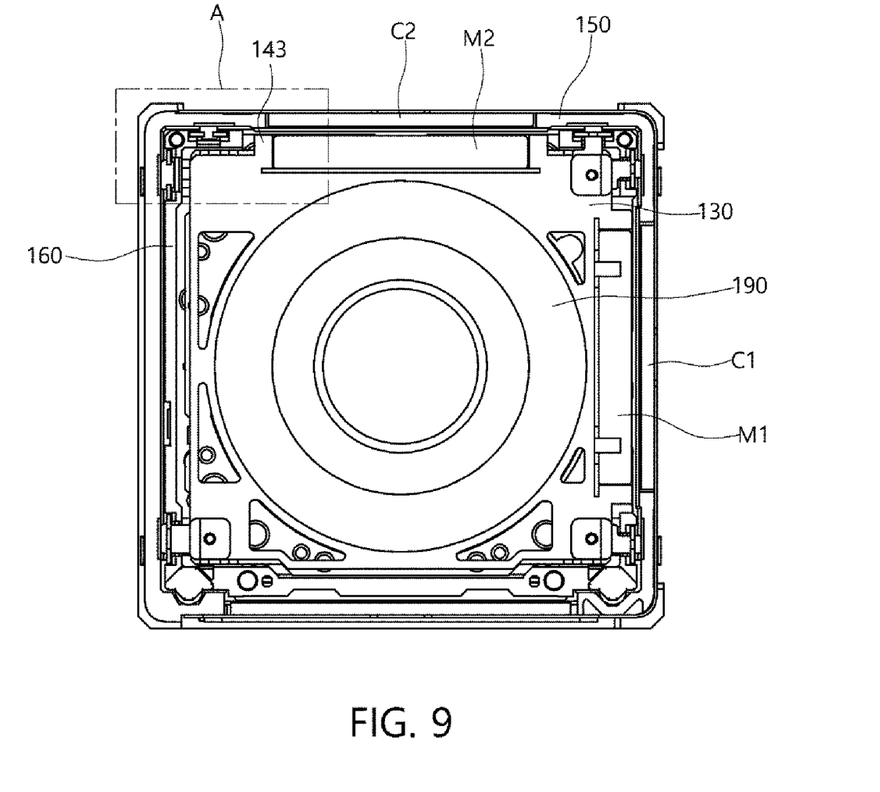
FIG. 9 is an internal plan view of the actuator according to an exemplary embodiment of the present invention.
Figure 10:
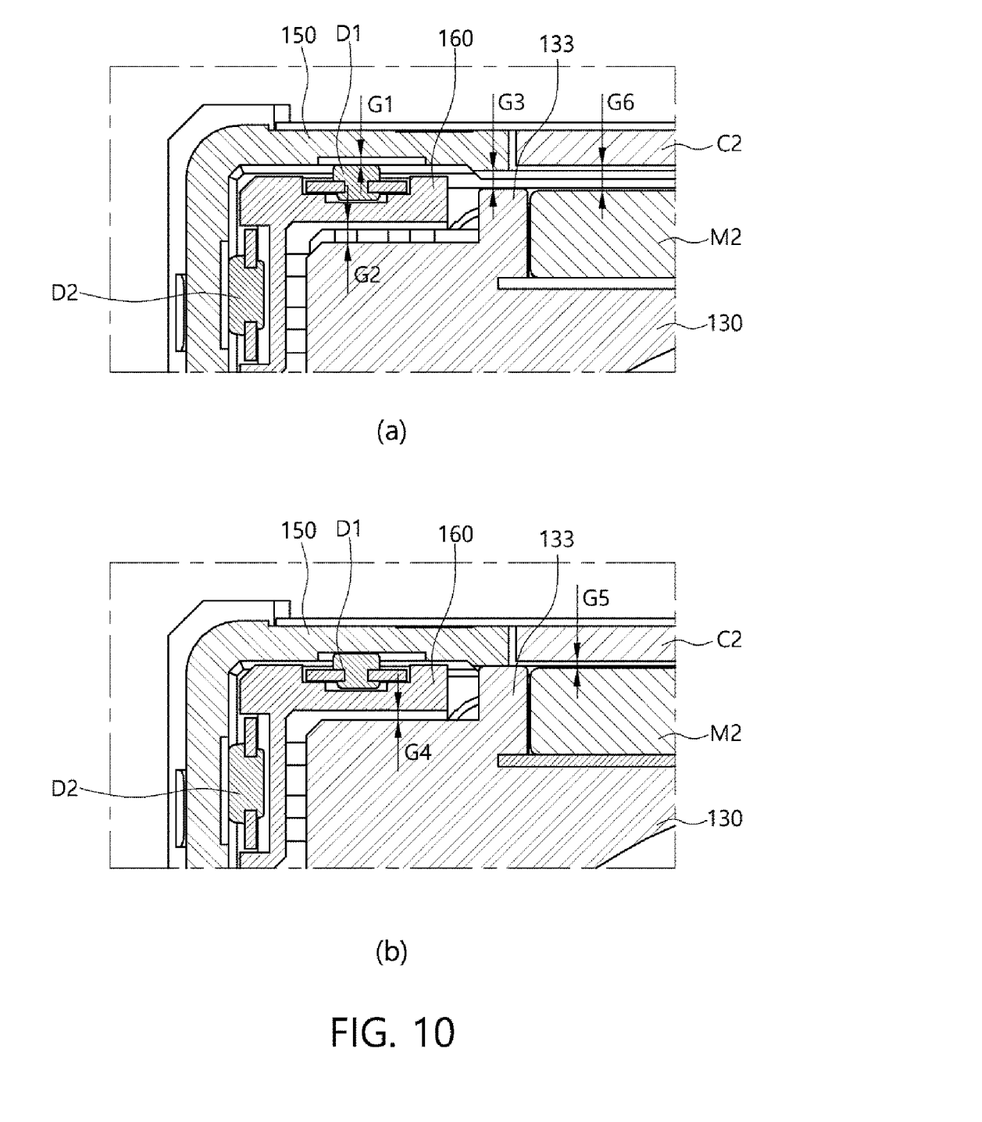
FIG. 10 is a partially enlarged view of part A of FIG. 9.

FIG. 9 is an internal plan view of the actuator according to an exemplary embodiment of the present invention, and FIG. 10 is a partially enlarged view of part A of FIG. 9.

Herein, FIG. 10(a) is a view of a state in which there is no external impact due to the fall of a product to which the actuator 100 is mounted, and FIG. 10(b) is a view of a state in which an external impact occurs.

Referring to FIGS. 9 and 10, as described above, the actuator 100 according to an exemplary embodiment of the present invention is configured to include an OIS carrier 140 on which the lens module 190 is mounted, an AF carrier 160 in which the OIS carrier 140 is accommodated, and a housing 150 in which the AF carrier 160 is accommodated.

Herein, the OIS carrier 140 moves the lens module 190 in the first direction and the second direction, and the AF carrier 160 moves the OIS carrier 140 in the optical axis direction.

The OIS carrier 140 includes first and second magnets (M1, M2), and the housing 150 faces the first and second magnets (M1, M2) and includes first and second driving coils (C1, C2).

Herein, the AF carrier 160 may include a first damper D1 and a second damper D2 in order to mitigate the impact when the AF carrier 160 and the housing 150 come into contact with each other.

Referring to FIG. 10(a), a first gap (G1) for moving the AF carrier 160 is formed between the AF carrier 160 and the housing 150, and a second gap (G2) for providing a movement space of the OIS carrier 140 is formed between the OIS carrier 140 and the AF carrier 160. For example, the first gap (G1) may be 0.1 mm, and the second gap (G2) may be 0.22 mm.

The OIS carrier 140 of the actuator 100 according to an exemplary embodiment of the present invention may be provided with an auxiliary stopper 143 protruding so as to be able to contact the housing 150 through the opening 163 provided in the AF carrier 160. When the OIS carrier 140 moves in at least one of the first direction and the second direction due to an external impact, the auxiliary stopper 143 comes into contact with the inner surface of the housing 150 to limit the movement of the OIS carrier 140.

Referring to FIG. 10(a), a third gap (G3) is formed between the auxiliary stopper 143 and the housing 150 in the absence of an external impact. For example, the third gap G3 may be 0.24 mm.

Herein, the third gap (G3) is formed to be larger than the second gap (G2) in order not to interfere with the OIS driving of the OIS carrier 140.

In addition, the third gap (G3) is formed to be smaller than the sum of the first and second gaps (G1+G2) in order to prevent a collision between the OIS carrier 140 and the AF carrier 160 due to an external impact.

Accordingly, referring to FIG. 10(b), when the auxiliary stopper 143 comes into contact with the housing 150 due to an external impact, both of the first gap (G1) and the second gap (G2) do not disappear, and the sum of the first gap (G1) and the second gap (G2) is maintained as a fourth gap (G4). For example, the AF carrier 160 and the housing 150 are in contact, and the fourth gap (G4) is maintained between the OIS carrier 140 and the AF carrier 160.

In addition, when the auxiliary stopper 143 is in contact with the housing 150, at least one of between the first magnet (M1) and the first driving coil (C1) and between the second magnet (M2) and the second driving coil (C2). is maintained as a fifth gap which is a safe distance. For example, the fifth gap (G5) may be 0.09 mm.

Accordingly, even when an external impact occurs, it is possible to prevent damage to the first and second driving coils (C1, C2) due to the contact between the first and second magnets (M1, M2) and the first and second driving coils (C1, C2), and to maintain reliability.

Herein, in the absence of an external impact, a sixth gap (G6), which is the sum of the third gap (G3) and the fifth gap (G5), is formed between the first and second magnets (M1, M2) and the first and second driving coils (C1, C2). For example, the sixth gap (G6) may be 0.33 mm.

As such, the actuator 100 according to an exemplary embodiment of the present invention has a smaller third gap (G3) formed between the first and second magnets (M1, M2) and the first and second driving coils (C1, C2), compared to the conventional actuator.

The auxiliary stopper 143 protrudes toward the housing 150 and is respectively provided on both sides of the first and second magnets (M1, M2). Accordingly, the thicknesses of the first and second magnets (M1, M2) may be formed to correspond to the length of the auxiliary stopper 143.

As such, since the actuator 100 according to an exemplary embodiment of the present invention minimizes the gap between the first and second magnets (M1, M2) and the first and second driving coils (C1, C2) while simultaneously increasing the thicknesses of the first and second magnets (M1, M2), it is possible to provide a sufficient driving force to the OIS carrier 140, according to the movement of the OIS carrier 140 even in a section where the OIS carrier 140 and the AF carrier 160 are farthest apart from each other.

In addition, the actuator 100 according to an exemplary embodiment of the present invention may drive the lens module 190 or the image sensor with a stroke with a relatively long distance by increasing the driving force, and not only is it possible to effectively apply to an image sensor and lens module having a large size and weight, but also it is possible to secure product reliability.

In summary, the actuator 100 according to an exemplary embodiment of the present invention has advantages in that by including an auxiliary stopper 143 on one side of the OIS carrier, it is possible to prevent collision between components, and while the volume of the existing dampers (D1, D2) is reduced, it is possible to provide the same or higher function than that of the existing actuator, and accordingly, it is possible to increase the driving force within a limited space without increasing the space of the actuator 100 by securing more space for the driving unit (magnets (M1, M2) and coils (C1, C2)).

In the above, although the present invention has been described with reference to the limited exemplary embodiments and drawings, the present invention is not limited thereto and it will be apparent that various modifications and variations are possible within the scope of the technical spirit of the present invention and equivalents of the claims to be described below by one of ordinary skill in the art to which the present invention pertains.

In the above description of this specification, the terms such as "first" and "second" are merely conceptual terms used to relatively identify components from each other, and thus, they should not be interpreted as terms used to denote a particular order, priority or the like.

The drawings for illustrating the present invention and its exemplary embodiments may be shown in somewhat exaggerated form in order to emphasize or highlight the technical contents of the present invention, but it should be understood that various modifications may be made by those skilled in the art in consideration of the above description and the illustrations of the drawings without departing from the scope of the present invention.

What is claimed is:

1. An actuator for a camera, comprising:
   an OIS carrier moving in at least one of a first direction perpendicular to an optical axis direction and a second direction perpendicular to the first direction;
   an AF carrier for accommodating the OIS carrier and moving in the optical axis direction together with the OIS carrier; and
   a housing in which the AF carrier is accommodated,
   wherein the AF carrier includes an opening such that the OIS carrier faces the housing,
   wherein the OIS carrier includes an auxiliary stopper protruding so as to be able to contact the housing through the opening,
   wherein a first gap for moving the AF carrier is formed between the AF carrier and the housing, and
   wherein a second gap for providing a movement space of the OIS carrier is formed between the OIS carrier and the AF carrier.

2. The actuator of claim 1, wherein the auxiliary stopper is in contact with the housing when the OIS carrier is moved in at least one of the first direction and the second direction by an external impact to limit the movement of the OIS carrier.

3. The actuator of claim 1, wherein the OIS carrier mounts a lens module or an image sensor.

4. The actuator of claim 1, wherein a third gap which is larger than the second gap and smaller than the sum of the first gap and the second gap is formed between the auxiliary stopper and the housing.

5. The actuator of claim 4, wherein when the auxiliary stopper contacts the housing, the sum of the first gap and the second gap is maintained as a fourth gap which is greater than 0.

6. The actuator of claim 5, wherein the OIS carrier is provided with a first magnet and a second magnet, and
   wherein the housing is provided with a first driving coil that generates an electromagnetic force in the first magnet to move the OIS carrier in the first direction, and a second driving coil that generates an electromagnetic force in the second magnet to move the OIS carrier in the second direction.

7. The actuator of claim 6, wherein the auxiliary stopper is respectively provided on both sides of the first magnet and the second magnet.

8. The actuator of claim 7, wherein the thicknesses of the first magnet and the second magnet are formed to correspond to the length of the auxiliary stopper.

9. The actuator of claim 8, wherein when the auxiliary stopper contacts the housing, a fifth gap which is smaller than the fourth gap is formed in at least one of between the first magnet and the first driving coil and between the second magnet and the second driving coil.

10. The actuator of claim 9, wherein a sixth gap in which the third gap and the fifth gap are added is formed between the first magnet and the first driving coil and the sixth gap is formed between the second magnet and the second driving coil.

11. The actuator of claim 1, further comprising:
    a middle guide configured to be disposed under the OIS carrier and accommodated in the AF carrier.

* * * * *